Patented Sept. 9, 1941

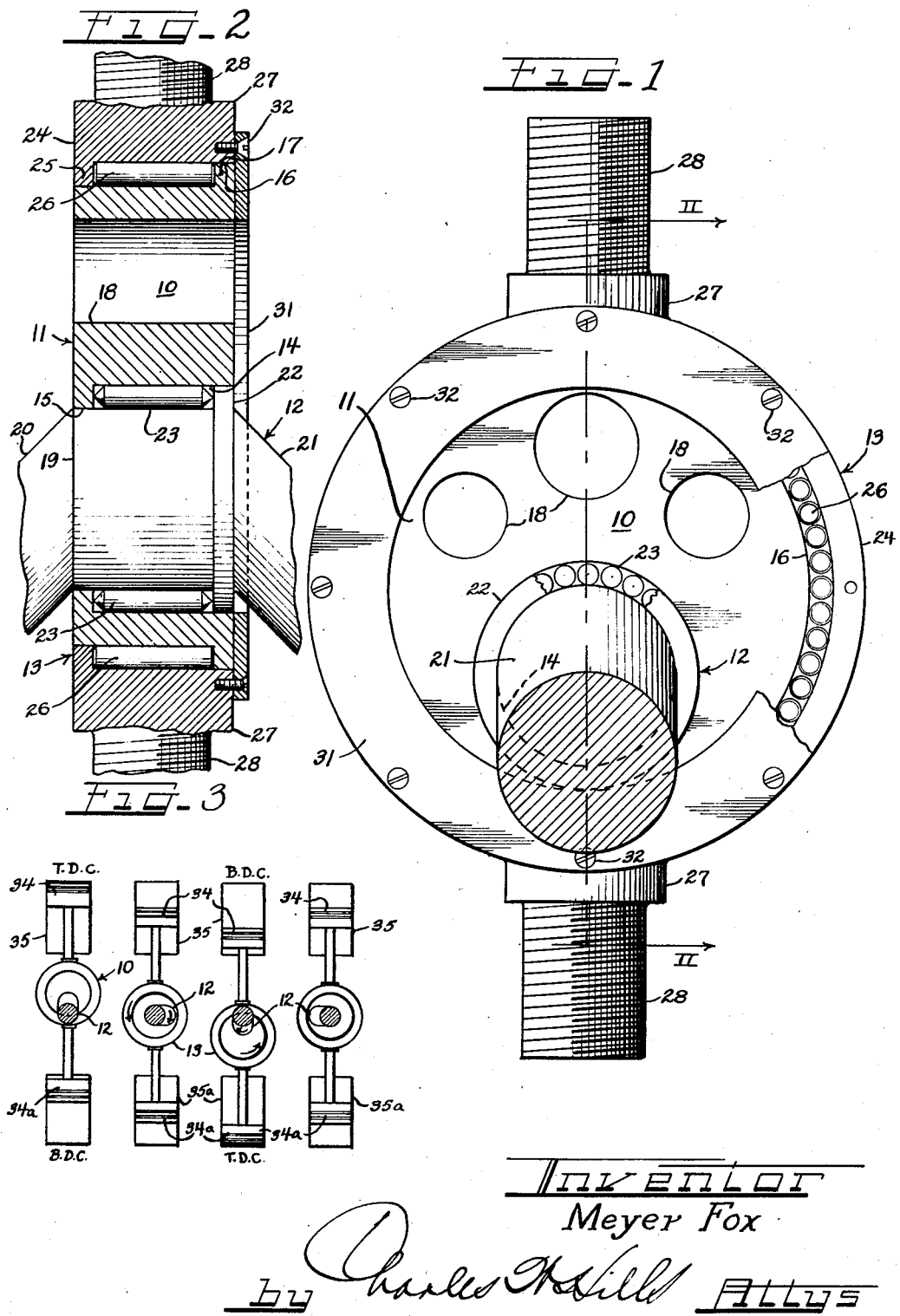

2,255,614

UNITED STATES PATENT OFFICE 2,255,614

ECCENTRIC SATELLITE CRANK

Meyer Fox, Chicago, Ill.

Application April 17, 1940, Serial No. 330,103

3 Claims. (Cl. 74—50)

The present invention relates to novel improvements in mechanical movements, and more particularly to an eccentric satellite crank construction for translating reciprocating motion into rotary motion without employing other devices, such, for example, as connecting rods and the like.

While the device of the present invention is particularly applicable to engines, such as steam engines, internal combustion engines, and the like, it is to be understood that it may be used in any mechanisms where it is desired to change from one motion to the other.

It is therefore an important object of the present invention to provide a simple and highly efficient means for translating mechanical movements from one direction into a different direction.

Another object of this invention is to provide a device capable of translating reciprocating motion into rotary motion, or vice-versa, and which reduces wear, friction, and vibration to a minimum.

Another object of this invention is to provide a device for translating mechanical movements employing fewer parts and parts of lighter weight than is usual in similar devices employed at the present time.

A further object of this invention is to provide a device for translating mechanical movements in which the parts can be so balanced as to eliminate rotational vibration.

A still further object of this invention is to provide a device for translating reciprocating motion into rotary motion, or vice-versa, in which the reactionary forces are substantially parallel with and in closely spaced relation from the axis of the reciprocating motion.

Another and further object of this invention is to provide an eccentric satellite crank construction, in connection with oppositely disposed reciprocating pistons, for translating mechanical movements without the need of wrist pins, joint connections, and the like.

A still further object of this invention is to provide an eccentric satellite crank construction in which the "throw" thereof is greater than the "throw" of the crank alone.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawing, in which:

Figure 1 is a side view in elevation, with portions broken away and parts shown in vertical cross section, of a device embodying the principles of this invention;

Figure 2 is a fragmentary vertical cross sectional view, with parts in elevation, taken substantially in the plane indicated by the line II—II of Figure 1; and Figure 3 is a diagrammatic view illustrating the relative position of parts at each quarter of a complete piston stroke.

Referring particularly to Figure 1, there is illustrated therein an eccentric satellite crank construction 10 generally comprising a disk 11, an offset crank 12, and a cross-head 13. The disk 11 is circular in shape and is provided with an eccentric opening 14. A shoulder 15 is provided at one end of the opening 14 and extends inwardly in concentric relation with the opening and in flush relation with the outer face of the disk, as illustrated in Figure 2.

The periphery 16 of the disk 11 terminates in an outwardly extending concentric shoulder 17 arranged in flush relation with the side surface of the disk opposite the side including the shoulder 15. Metal is removed from the disk 11, as shown by the openings 18, for the purpose of balancing the disk during rotation by offsetting the removal of metal in providing the eccentric opening 14.

The offset crank 12 comprises a crank pin 19, crank arms 20 and 21 in sloping angular relation therewith, and crankshaft ends (not shown) which support the crank 12 for rotation. A shoulder 22 is formed at one end of the crank pin 19. With the offset crank 12 disposed within the eccentric opening 14 of the disk 11, the shoulder 15 supports one end of the crank pin 19, and the crank pin shoulder 22 seats within the opening 14, as illustrated in Figure 2.

As shown in Figures 1 and 2, a plurality of needle bearings 23 are interposed between the shoulders 15 and 22 to permit the disk 11 to freely rotate on the crank pin 19.

The cross-head 13 comprises a ring member 24 having a concentric shoulder 25 extending inwardly in flush relation with an outside surface thereof. With the disk 11 disposed within the ring 24, as shown in Figure 2, the shoulder 17 seats against the inner side of the ring and the shoulder 25 seats against the periphery of the disk. A plurality of roller bearings 26 are interposed between the shoulders 17 and 25 to allow the disk 11 to freely rotate within the cross-head ring 24.

Diametrically disposed on opposite sides of the ring 24 are a pair of outwardly extending bosses 27 having threaded portions 28. The threaded portions 28 constitute piston rods and are threaded for the purpose of fixedly carrying thereon a pair of pistons, as shown in Figure 3. The axes of the crankshaft ends maintain a position intersecting the central longitudinal axis of the piston rods 28.

If it is desired to maintain the sides of the disk 11 and the cross-head 13 in constant alignment by reason of the device being used in an environment where pistons do not serve that purpose as they do in an internal combustion engine arrangement, a plate ring 31 is provided having the same outside diameter as the cross-head ring 24 and terminating inwardly of the outside diameter of the disk 11, as shown in Figures 1 and 2. The ring 31 is connected to the cross-head ring 24 at points adjacent its periphery by means of flathead screws 32. The ring 31, when so positioned, is arranged in face engagement with a side surface of the cross-head ring 24 and a portion of the adjacent side surface of the disk 11 and serves to hold the parts in alignment.

Figure 3 illustrates diagrammatically the relative position of parts when the eccentric satellite crank construction 10 is applied to an internal combustion engine. It is to be understood, however, that this application is for the purpose of description only, as the device of this invention is capable of being used wherever reciprocating motion is to be translated into rotary motion, or vice-versa.

Pistons 34 and 34a are threaded to the piston rods 28 and are disposed within cylinders 35 and 35a. As shown at the left in Figure 3, the upper piston 34 is at top dead-center, while the lower piston 34a is at bottom dead-center. When in this position, the parts of the eccentric satellite crank construction 10 are as illustrated in Figure 1. When the upper piston 34 moves downwardly half-way in its power stroke, a pushing force is applied to the disk 11 to move the crank pin 19 through an angle of 90°.

When the upper piston moves to its bottom dead-center position, a pulling force is exerted by the disk on the crank pin. With the upper piston in bottom dead-center position, the lower piston is at its top dead-center and is effective for starting on its upward or power stroke. The lower piston 34a then exerts forces in the same manner as described with the upper piston 34. The diagrammatic illustrations show the relative positions of the crank 12 and the cross-head 13 during each quarter of a full piston stroke, or at 90° apart. As shown by the arrows, the disk 11 rotates in the opposite direction to the crank pin 19 as the pistons 34 and 34a reciprocate.

It is to be further understood that while a pair of pistons are illustrated in the operation of the eccentric satellite crank construction 10, either of the piston rods may be used alone with but a single piston.

It is apparent from the foregoing description that the device of this invention eliminates the use of long connecting rods and wrist pins and makes it possible to build engines and other devices of the type using cylinders close to the crankshaft. The device permits reduction in the weight of the parts and cuts to a minimum the side thrust exerted by pistons by bringing the line of thrust substantially parallel to the cylinder side walls and in closer spaced relation to the center of the crank.

While a particular embodiment only of this invention has been illustrated, it will, of course, be understood that the invention should not be limited thereto, since many modifications may be made and, therefore, it is contemplated by the appended claims to cover all such modifications as fall within the true spirit and scope of the present invention.

I claim as my invention:

1. A satellite crank construction comprising a crosshead having a cylindrical bore therethrough with a reduced end portion providing a shoulder, a disk having a cylindrical portion sized for extending into the reduced end portion of the bore and a larger cylindrical portion sized for fitting into the larger portion of the bore and providing a shoulder on the disk, roller elements interposed between the larger portion of the bore and smaller portion of the disk spacing said shoulders apart to align the disk in the crosshead, and a detachable retainer on the crosshead thrusting against the larger portion of the disk to hold the disk in the crosshead whereby the parts are readily assembled.

2. A satellite crank construction comprising a crosshead having a cylindrical bore therethrough and an inturned flange portion at one end of the bore, a disk having a cylindrical periphery seated in said bore and an outturned flange in spaced relation from said inturned flange, antifriction elements between the disk and crosshead retained by said flanges, said disk having a cylindrical bore therethrough eccentric to the axis of the disk with an inturned flange at one end of the bore, a crank having a cylindrical bearing portion in said disk bore an an outturned flange in spaced relation from the inturned flange, antifriction elements between the cylindrical bearing portion of the crank and the disk retained by said outturned flange of the crank and said inturned flange of the disk, and a face plate detachably secured to the crosshead and thrusting against the disk at the outturned flanged end thereof to retain the parts in assembled aligned relation.

3. In an eccentric crank construction including a crosshead, a disk seated in said crosshead having an eccentric cylindrical bore therethrough, and a cylindrical bearing in said bore, the improvements which comprise an inturned shoulder in said crosshead at one face thereof, an outturned shoulder on said disk at the opposite face of the crosshead, roller elements between the crosshead and disk holding said shoulders in spaced relation to align the disk with the crosshead, an inturned shoulder on said disk extending into one end of said eccentric bore, an outturned shoulder at the opposite end of the cylindrical bearing, and roller elements between the bearing and disk holding said shoulders in spaced relation for aligning the bearing in the disk.

MEYER FOX.